A. F. BRADY.
PUNCTURE PROOF TIRE LINING.
APPLICATION FILED JUNE 8, 1914.

1,176,424.

Patented Mar. 21, 1916.

WITNESSES:
Charles Pickles
Thos. Eastberg

INVENTOR
Arthur F. Brady
BY G. H. Stroug
ATTORNEY

UNITED STATES PATENT OFFICE.

ARTHUR F. BRADY, OF SAN FRANCISCO, CALIFORNIA, ASSIGNOR OF ONE-HALF TO E. C MAILLIARD, OF SAN FRANCISCO, CALIFORNIA.

PUNCTURE-PROOF TIRE-LINING.

1,176,424. Specification of Letters Patent. Patented Mar. 21, 1916.

Application filed June 8, 1914. Serial No. 843,701.

*To all whom it may concern:*

Be it known that I, ARTHUR F. BRADY, a citizen of the United States, residing in the city and county of San Francisco and State of California, have invented new and useful Improvements in Puncture-Proof Tire-Lining, of which the following is a specification.

This invention relates to a puncture-proof tire lining.

One of the objects of the present invention is to provide a simple, substantial, cheaply manufactured puncture and blow-out proof lining, constructed of flexible metal, chain mail fabric for pneumatic tires, which is adapted to be inserted between the inner tube and the main casing; there being usually provided a secondary lining to prevent the chain fabric from injuring either the inner tube or the casing.

Another object of the invention is to provide means for securing the flexible metal tire lining in position when the tire is inflated.

Further objects will hereinafter appear.

The invention consists of the parts and the construction and combination of parts as hereinafter more fully described and claimed, having reference to the accompanying drawings, in which—

Figure 1:
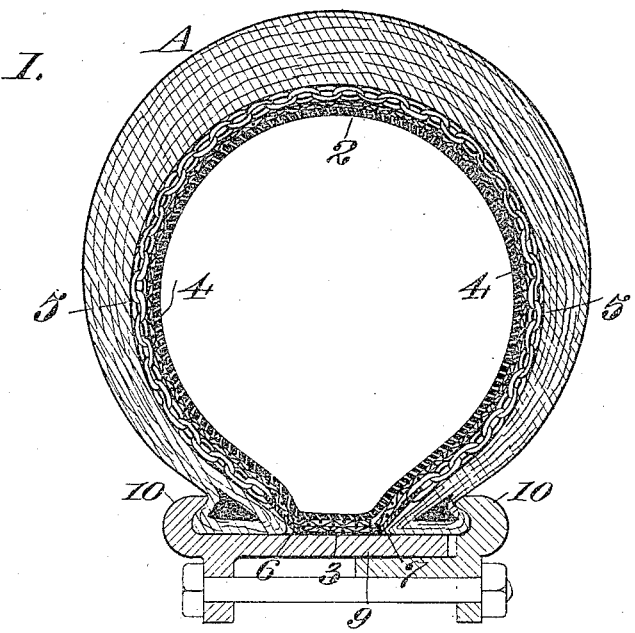
Figure 2:
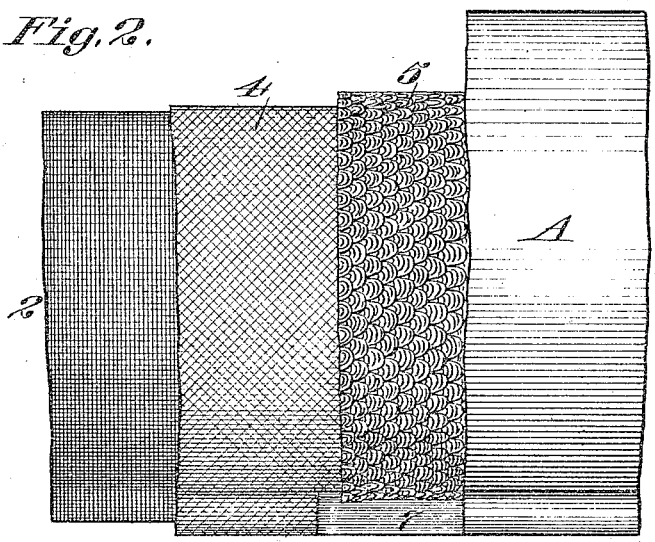
Figure 3:
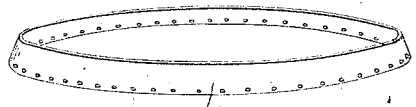

Figure 1 is a cross section of a pneumatic tire, shewing the application of the invention. Fig. 2 is a side elevation of same partly broken away. Fig. 3 is a perspective of a flanking ring for the chain armor.

Referring to the drawings, A indicates an ordinary outer tire casing and 2 the inner tube. Surrounding the inner tube, or wrapped around same so that the edges will overlap each other, as at 3, on the lower side of the inner casing, is a strip of canvas, or the like, 4, and interposed between the outer casing and said canvas protector is a lining 5 constructed of flexible metal fabric, preferably tightly woven, case hardened, chain mesh, or chain armor, as shown, for the reason of its flexibility and wearing qualities in addition to its impenetrability by nails, tacks, etc. This chain mail is so formed as to practically surround the entire surface of the inner tube and is attached at its edges to a pair of rings 6—7, one on each side of the inner tube. These rings are just large enough to slip on over the metal rim 9 and to be retained by and between the clencher flanges 10. They may be dish-shaped more or less to allow them readily to conform to the tire parts when the tire is inflated.

The inflation of the tire will cause the flexible metal lining to be tightly and evenly stretched around same and any injury to the inner tube by chafing is prevented by the provision of the inner canvas covering 4, at the same time the tire as a whole retains its natural elasticity; the wire weave being such that it yields to bumps and inequalities in the readway, yet stubbornly resists puncture. It also relieves the outer casing from the liability to blow-outs.

The outer casing A and tube 2 are constructed and attached to the wheel in the usual manner, and the materials and finish of the inner puncture and blow-out proof lining may be such as the experience and judgment of the manufacturer may dictate.

Having thus described my invention, what I claim and desire to secure by Letters Patent is—

In combination with a wheel rim, an inner tube and an outer casing having spaced beads which seat on the rim, rings formed of flat plate metal set on edge to have their inner edges directly engaged with the rim, and a metal fabric lining connected at its sides to the peripheral portions of the rings and disposed between the inner tube and casing, the free inner edges of said beads abutting the outer faces of said rings, said rings being of relatively great width so as to provide wide walls against which the inner tube may exert pressure to effect positive outward movement of the beads upon inflation of the inner tube.

In testimony whereof I have hereunto set my hand in the presence of two subscribing witnesses.

ARTHUR F. BRADY.

Witnesses:
JAMES MASON,
ERNEST H. MAILLIAR.